Aug. 15, 1933.   A. KEGRESSE   1,922,768
ENDLESS TRACK VEHICLE
Filed March 31, 1931
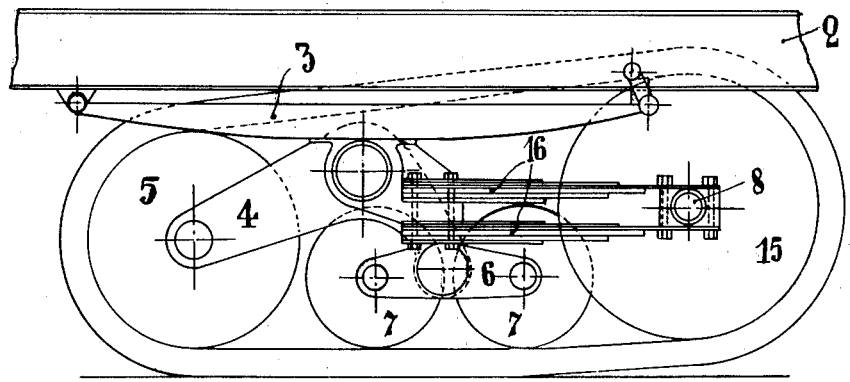
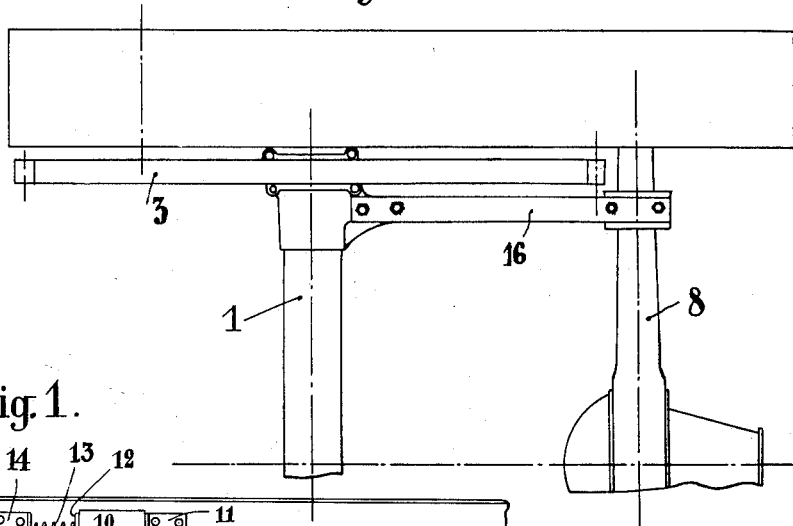
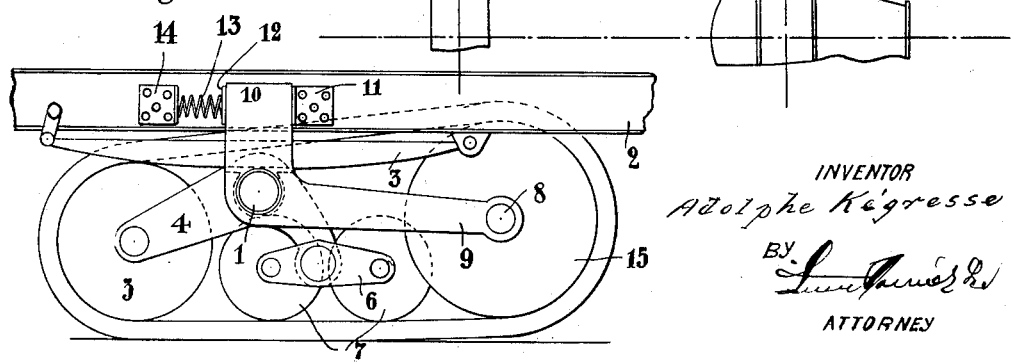
INVENTOR
Adolphe Kégresse
BY
ATTORNEY Patented Aug. 15, 1933

1,922,768

UNITED STATES PATENT OFFICE 1,922,768

ENDLESS TRACK VEHICLE

Adolphe Kégresse, Courbevoie, France

Application March 31, 1931, Serial No. 526,744, and in France April 3, 1930

6 Claims. (Cl. 305—9)

There is a decided advantage in vehicles propelled by means of endless bands to arrange the driving pulleys as close to the ground as possible, without however, a permanent contact therewith.

From the suspension viewpoint, all the driving axles of endless chain vehicles, without an exception, heretofore belonged to two well defined types, viz:—

1. Those wholly independent and bearing directly on the ground.

2. Those associated with the chassis to which they are either rigidly connected or suspended through a yielding or unyielding system.

As far as the type of driving axles associated with the chassis is concerned, the height of the axle above the ground varies with that of the frame, so that as the chassis comes closer to the ground, as a result e. g. of a deflection of the suspension springs, the driving pulley will also come closer thereto, thus altering the angle of the endless band with the ground at the leading or trailing side thereof according to whether the driving axle is considered as arranged before or behind the set of rollers.

It has been found in practice that it is highly important that the driving axle should be maintained at constant height above the (flat) ground and very close thereto while allowing the same to rise when running over accidental obstacles.

If such result is to be obtained constantly, it is necessary that the connection of the axle with the remainder of the vehicle should be so provided as to allow the distance between the axle and the chassis to vary without materially influencing the position of the axle with respect to the ground.

This invention has for its object the provision of an arrangement allowing such result to be attained.

Two embodiments of such an arrangement are shown by way of example in the drawing appended hereto.

Figure 1 is a diagrammatical view in elevation of one of the combinations proposed.

Figure 2 is a similar elevational view of a further embodiment of the device.

Figure 3 is a plan view of Fig. 2.

In all the figures, the carrying axle is indicated at 1 and the chassis at 2.

The carrying axle is connected to the chassis through a pair of longitudinal springs 3. Mounted in a known manner on the carrying axle is the main equalizer 4 of the carrying gear, which is provided at one end thereof with the loose pulley 5 and at the other end with the roller connecting equalizers 6 (Figs. 1 and 2).

In the embodiment shown in Fig. 1, the driving axle 8 is connected with the carrying axle 1 through a two-arm equalizer pivoted on the carrying axle 1 and the longer arm 9 of which connects the driving axle 8 with the carrying axle 1.

The shorter arm 10 is arranged vertically above the carrying axle 1. The said arm 10 is adapted to slide vertically on a part 11 rigidly secured to the chassis 2 and on a further part 12 pressed by a spring 13 against the other face of the shorter arm 10.

The spring 13 bears with its other end against a member 14 rigidly secured to the chassis.

The positions of the parts 11 and 14 on the chassis are so arranged that the driving pulleys 15 carried on the driving axle 8 will remain at a certain height above the ground.

It will be seen readily that as the suspension spring 3 is deflected on any account, either by the effect of the load or by reason of oscillations resulting from the condition of the road, the position of the driving pulley 15 with respect to the ground will not change. Effectively, the chassis 2 will come closer to the carrying axle as the springs 3 become deflected and the part 10 will slide between the parts 11 and 12 without materially affecting the longer arm 9 supporting the driving axle.

On the other hand, on the pulley 15 encountering a somewhat important obstacle, then the pulley will be able to rise while carrying along the driving axle inasmuch as the two-branch lever 9, 10 is adapted to rock about the carrying axle 1 and compress the spring 13 with its smaller arm 10.

After the obstacle is run over, the axle will automatically come back to its position by the action of gravity on one hand and that of the spring 13 on the other hand.

Referring to the embodiment shown in Figs. 2 and 3, the carrying axle 1 is connected to the driving axle through a pair of superimposed spring halves 16 the thick ends of which are rigidly secured to the carrying axle 1; the thin ends of the two springs halves are clamped over the driving axle 8.

The spring halves 16 consist of a central main leaf on either side of which there are mounted a number of secondary leaves corresponding to the spring power to be obtained.

It will be appreciated that the said spring halves are adapted to operate in both directions. They are so designed that in their normal position they will maintain the driving pulleys at the desired height above the ground. It will be understood that under the action of an obstacle the driving pulley will rise while compressing the upper leaves of the springs 16, and will automatically come back into its position under the action of the said leaves on one hand and that of gravity on the other hand.

The return to normal position will take place without an impact upon the bottom leaves of the springs.

It will also be appreciated that the height of the axle will be independent of the deflection of the suspension spring 3 inasmuch as the said axle is associated with the carrying axle to which it is yieldingly connected without any further connection with the chassis of the vehicle.

Having now particularly described and ascertained the nature of my said invention and in what manner the same is to be performed, I declare that what I claim is:—

1. In an endless track vehicle having a driving axle and a second axle, vehicle supporting wheels carried by said axles, an endless track extending about said wheels, a longitudinal spring connected to the chassis of the vehicle, a carrying axle supported by the spring intermediate the ends of the spring, means for elastically dampening the movement of the driving axle relative to the carrying axle comprising an element fixed on the carrying axle and an arm connecting the element to the driving axle.

2. The combination set forth in claim 1, wherein the elastic dampening means connects the driving axle, the carrying axle and the chassis.

3. The combination set forth in claim 1, wherein the elastic dampening means comprises a bell crank lever pivoted on the carrying axle, said lever having one arm attached to the driving axle and the other arm slidably and elastically attached to the chasis.

4. The combination set forth in claim 1, wherein the elastic dampening means comprises a bell crank lever pivoted on the carrying axle, said lever having a longer arm attached to the driving axle and a shorter arm slidably attached to the chassis, and means on the chassis for cushioning movement of the shorter arm of said lever.

5. The combination set forth in claim 1, wherein the elastic dampening means comprises a spring, one end of which is attached to the driving axle and the other end of which is attached to the carrying axle.

6. The combination set forth in claim 1, wherein the elastic dampening means comprises a plurality of leaf springs connecting the driving axle and the carrying axle.

ADOLPHE KÉGRESSE.